(12) United States Patent
Chen

(10) Patent No.: US 8,087,788 B2
(45) Date of Patent: Jan. 3, 2012

(54) PROJECTOR WITH COOLING CONFIGURATION

(75) Inventor: Chien-Fu Chen, Taipei Hsien (TW)

(73) Assignee: Hon Hai Precision Co., Ltd., Tu-Cheng, New Tapei (TW)

( * ) Notice: Subject to any disclaimer, the term of this patent is extended or adjusted under 35 U.S.C. 154(b) by 428 days.

(21) Appl. No.: 12/331,441

(22) Filed: Dec. 10, 2008

(65) Prior Publication Data

US 2010/0045941 A1 Feb. 25, 2010

(30) Foreign Application Priority Data

Aug. 20, 2008 (CN) .......................... 2008 1 0304063

(51) Int. Cl.
*G03B 21/16* (2006.01)
(52) U.S. Cl. ........................................................ 353/61
(58) Field of Classification Search .................... 353/52, 353/57, 58, 60, 61, 101, 119; 362/294, 373; 348/748, 771; 372/36; 165/275
See application file for complete search history.

(56) References Cited

U.S. PATENT DOCUMENTS

| 6,447,121 | B1 | 9/2002 | Woo | |
|---|---|---|---|---|
| 7,384,151 | B2 * | 6/2008 | Seki | ................ 353/52 |
| 2005/0201107 | A1 | 9/2005 | Seki | |
| 2006/0170876 | A1 * | 8/2006 | Takemi et al. | .................. 353/61 |

FOREIGN PATENT DOCUMENTS

| CN | 2685962 Y | 3/2005 |
|---|---|---|
| CN | 101046611 A | 10/2007 |
| CN | 101068008 A | 11/2007 |
| JP | 200160788 A | 3/2001 |
| JP | 2005241969 A | 9/2005 |
| JP | 2008181776 A | 8/2008 |

* cited by examiner

*Primary Examiner* — Georgia Y Epps
*Assistant Examiner* — Don Williams
(74) *Attorney, Agent, or Firm* — Altis Law Group, Inc.

(57) ABSTRACT

A projector includes a casing, an optical engine, and a heat dissipating module. The casing includes a first sidewall, a front wall defining a hole, a second sidewall, and a rear wall connected in sequence. The optical engine includes a lens module substantially aligned with the hole defined by the front wall, a DMD, and an illuminator module. The illuminator module is arranged at a side of the lens module away from the second sidewall, and includes a housing having a side surface away from the lens module and at least one light source installed on the side surface. The heat dissipating module includes a first heat sink attached to the at least one light source, a blower, and an exhaust fan. The blower is for blowing air towards the first heat sink from an air inlet.

20 Claims, 5 Drawing Sheets

PROJECTOR WITH COOLING CONFIGURATION

TECHNICAL FIELD

The present disclosure relates to projectors and, particularly, to a projector having an effective cooling configuration.

DESCRIPTION OF THE RELATED ART

Due to reduction of the size of projectors, the density of generated heat in projectors increases quickly. As a result, performance and reliability of the projectors will be influenced if heat dissipation is not effectively provided, and the life span of the projectors may even be shortened. Hence, how to discharge the increased heat effectively is a great challenge to designers in related fields.

What is needed, therefore, is a projector with a reduced size and having effective heat dissipation.

BRIEF DESCRIPTION OF THE DRAWINGS

Many aspects of the present projector can be better understood with references to the accompanying drawings. The components in the drawing are not necessarily drawn to scale, the emphasis instead being placed upon clearly illustrating the principles of the present projector.

DETAILED DESCRIPTION OF THE EMBODIMENTS

Embodiments of the present disclosure will now be described in detail below, with references to the accompanying drawings.

Figure 1:
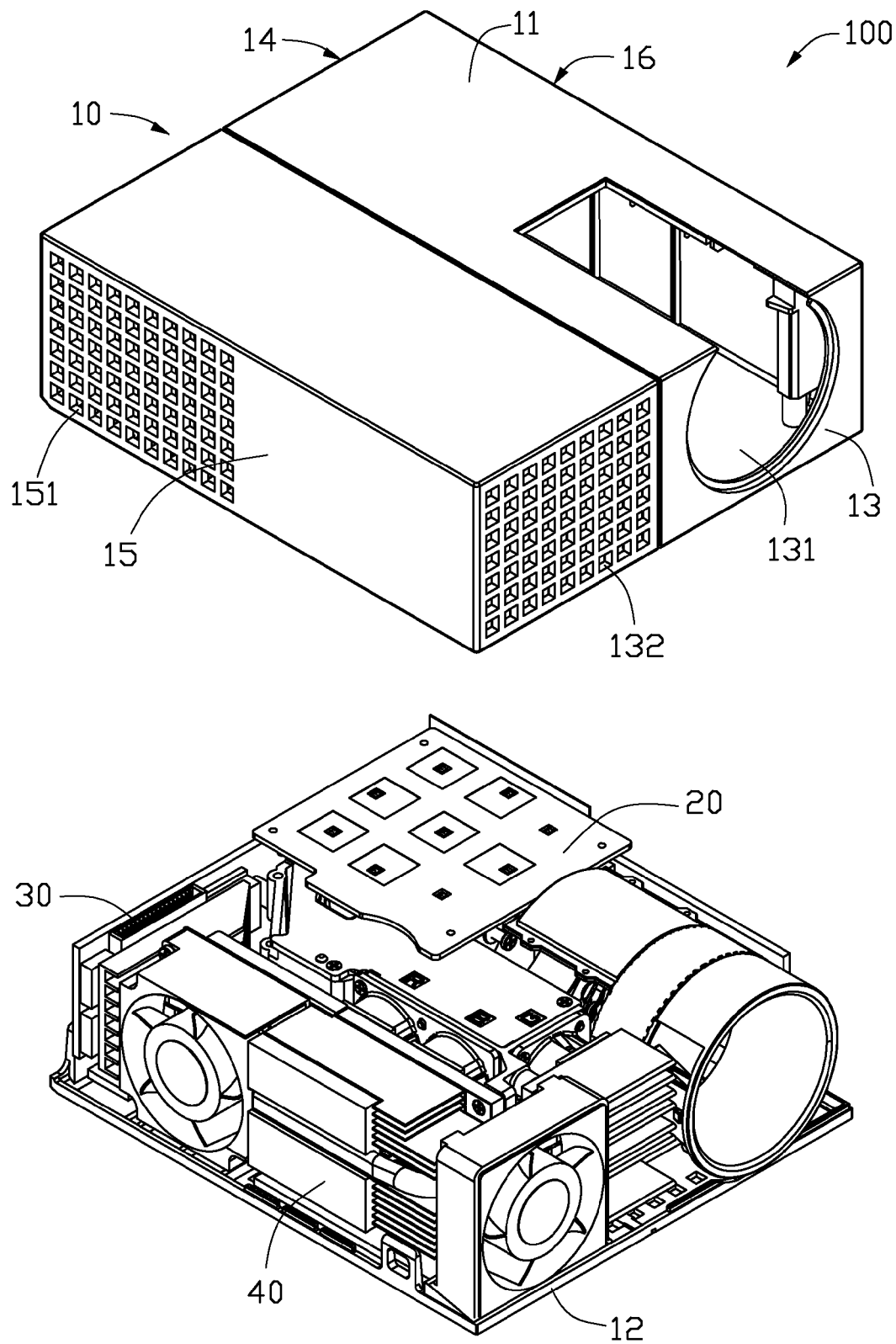
FIG. 1 is a partially exploded, isometric view of a projector according to a first exemplary embodiment.

Referring to FIG. 1, a projector 100 according to a first exemplary embodiment is shown. The projector 100 includes a casing 10, an optical engine 20, a printed circuit board (PCB) 30, and a heat dissipating module 40.

The casing 10 is configured for housing the optical engine 20, the PCB 30, and the heat dissipating module 30. The casing 10 includes a top wall 11, a bottom wall 12, a front wall 13, a rear wall 14, a first sidewall 15, and a second sidewall 16. The first sidewall 15, the front wall 13, the second sidewall 16, and the rear wall 14 are connected in sequence. In the present embodiment, the front wall 13 defines a hole 131 adjacent to the second sidewall 16 and a grid-shaped air outlet 132 adjacent to the first sidewall 15. The first sidewall 15 defines a first grid-shaped air inlet 151 adjacent to the rear sidewall 14, and the rear wall 14 also defines a second grid-shaped air inlet 141 (see FIG. 3) adjacent to the first sidewall 15.

Figure 2:
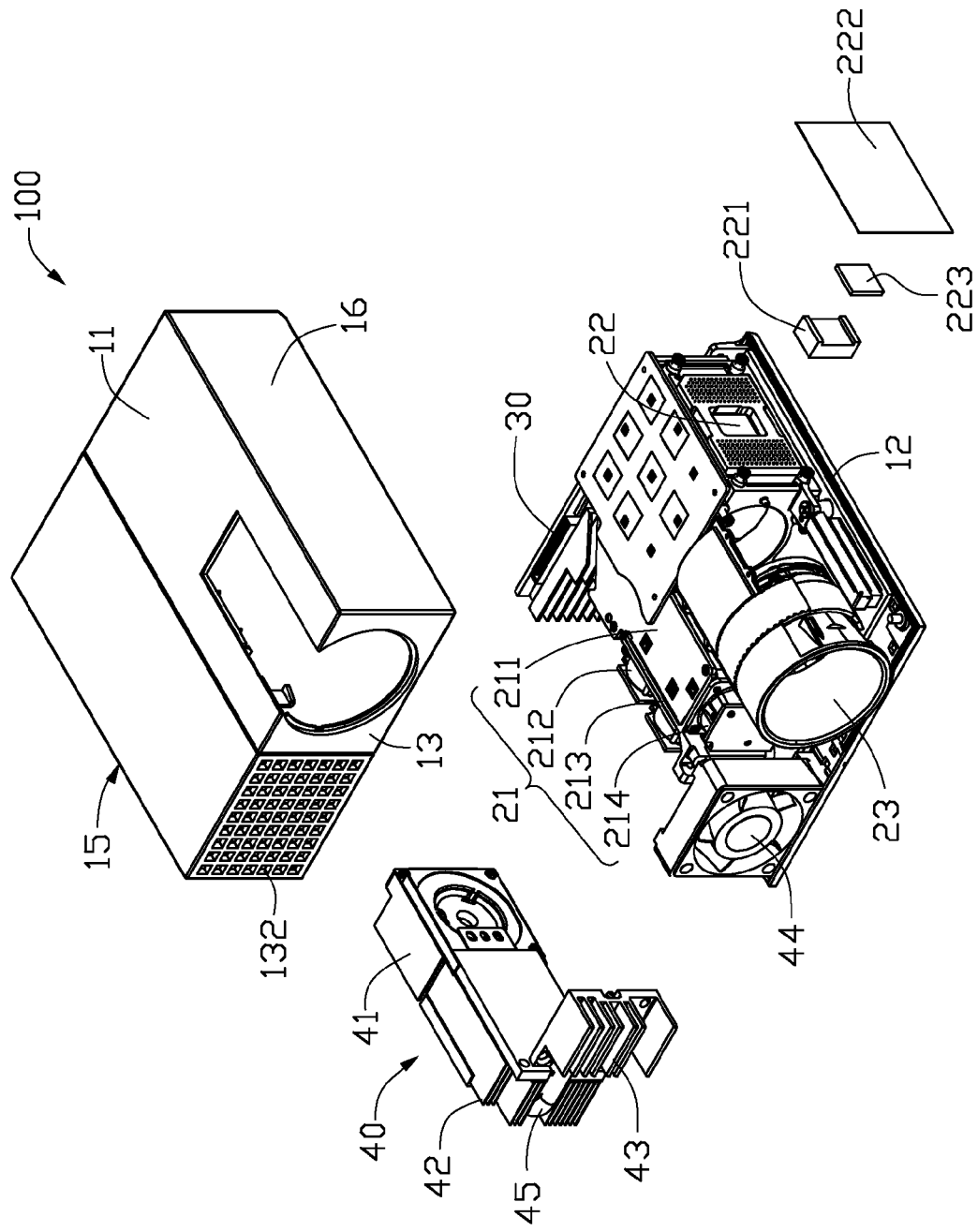
FIG. 2 is an exploded, isometric view of the projector of FIG. 1, viewed from another perspective.

Referring to FIG. 2, the optical engine 20 is configured for projecting an image onto a screen (not shown). The optical engine 20 includes an illuminator module 21, a digital micromirror device (DMD) 22, and a projection lens module 23. The formation of the image on a screen is by the following process: firstly, light emitted from the illuminator module 21 is concentrated and reflected to the DMD 22 by optical components (not shown), such as converging lens and reflecting mirror. The DMD 22 reflects the light and produces the image towards the projection lens module 23 which focusing the image and then projects the image onto the screen.

The projection lens module 23 is substantially aligned with the hole 131 of the front wall 13. The illuminator module 21 is disposed at a side of the lens module 23 away from the second sidewall 16. The DMD 22 is attached to a heat conductive plate 221 for transmitting heat generated from the DMD 22 out from the optical engine 20. In the present embodiment, the heat conductive plate 221 is thermally connected to a heat diffusing plate 222 which is secured on the casing 10 and thermally connected to the casing 10. In order to decrease heat resistance between the heat conductive plate 221 and the heat diffusing plate 222, a thermal interface material 223 is disposed therebetween.

In the present embodiment, the illuminator module 21 includes a housing 211, a first light source 212, a second light source 213, and a third light source 214.

Figure 3:
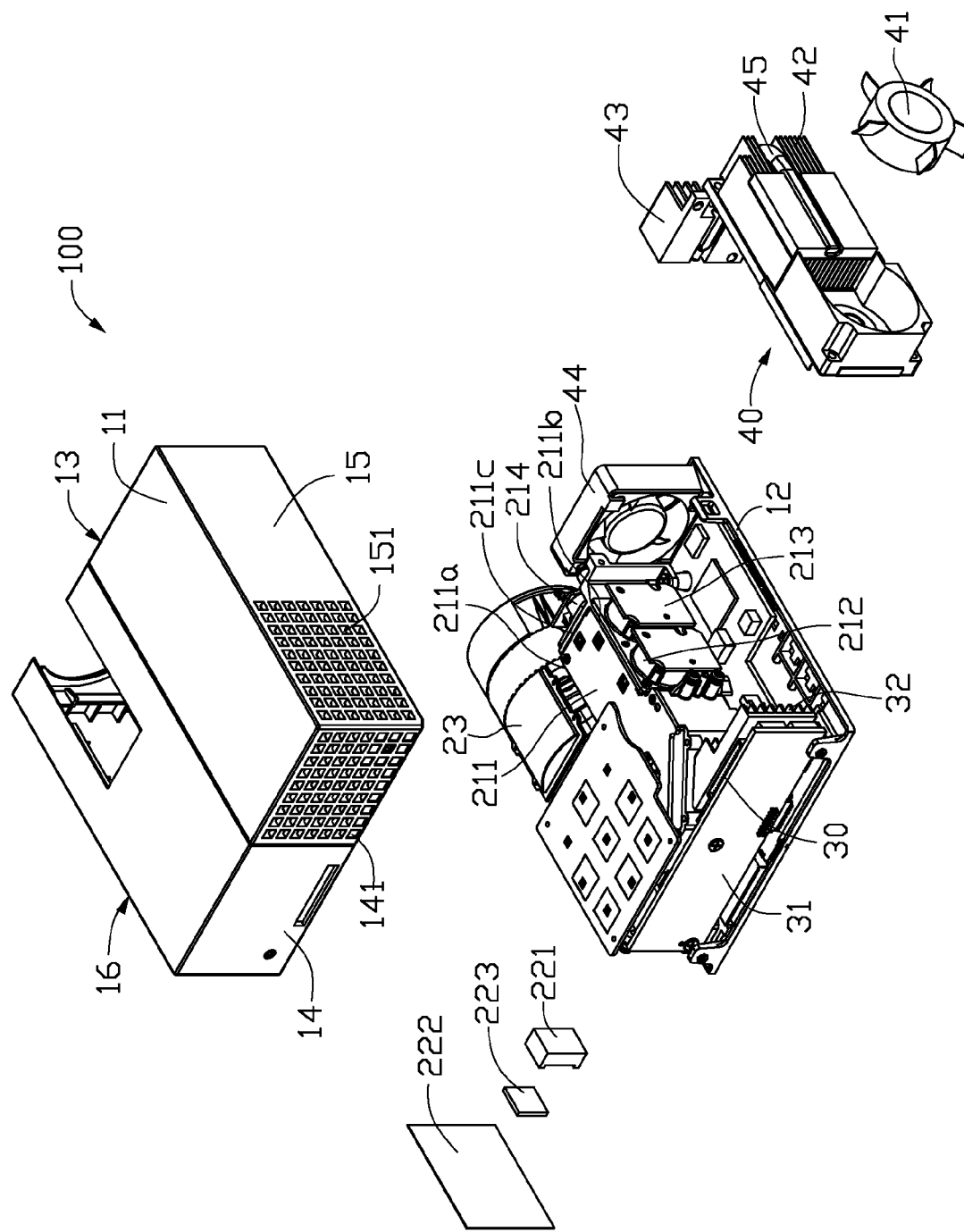
FIG. 3 is an exploded, isometric view of the projector of FIG. 2, viewed from an opposite side.

Further referring to FIG. 3, the housing 211 is substantially a cuboid including a first side surface 211a adjacent to the projection lens module 23, an opposite second side surface 211b away from the projection lens module 23, and an end surface 211c connecting the first and second side surfaces 211a and 211b. The first side surface 211a and the second side surface 211b are substantially parallel to the first sidewall 15 of the casing 10. The end surface 211c is substantially parallel to the front surface 13 of the casing 10.

The first light source 212 and the second light source 213 are installed on the second side surface 211b of the housing 211. The third light source 214 is installed on the end surface 211c of the housing 211. In the present embodiment, the first light source 212, the second light source 213, and the third light source 214 are a red light emitting diode (LED) light source, a blue LED light source, and a green LED light source respectively.

The PCB 30 is electrically connected to the optical engine 20 in order to control the projection of the optical engine 20. The PCB 30 is perpendicularly secured on the bottom wall 12 and substantially parallel to the rear wall 14. The PCB 30 is adjacent to the second air inlet 141 defined on the rear wall 14. In the present embodiment, the PCB 30 is attached to a metal board 31. The metal board 31 is secured on the bottom wall 12 and used to protect the PCB 30. In order to improve the heat dissipating efficiency of the PCB 30, a heat sink 32 is mounted on the PCB 30.

Figure 4:
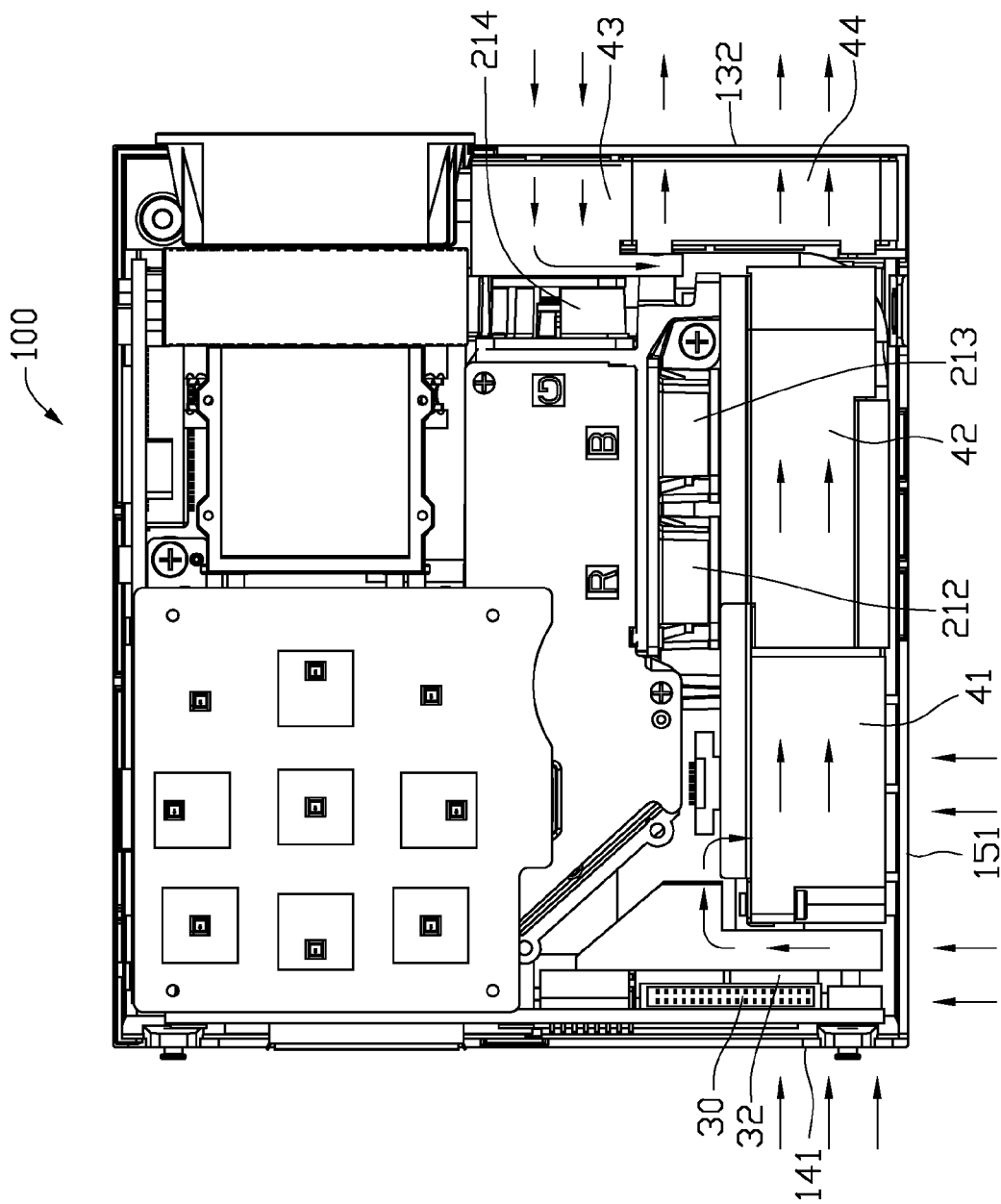
FIG. 4 is a top plan view of the projector of FIG. 1 without a top wall thereof.

Referring to FIGS. 2 and 4, the heat dissipating module 40 includes a blower 41, a first heat sink 42, a second heat sink 43, and an exhaust fan 44.

The blower 41 is arranged corresponding to the first air inlet 151 for blowing air into the casing 10 from the first air inlet 151 towards the air outlet 132. The exhaust fan 44 is arranged corresponding to the air outlet 132 for pulling the air out of the casing 10. Thus, a heat-dissipating route is formed between the first/second air inlets 151, 141 and the air outlet 132 of the casing 10.

The first heat sink 42 is attached to the first light source 212 and the second light source 213 for dissipating heat generated therefrom, and disposed in the heat-dissipating route formed between the first/second air inlets 151, 141 and the air outlet 132. The first heat sink 42 includes a number of fins substantially parallel to the bottom wall 12 of the casing 10. The height of the first heat sink 42 along a direction perpendicular to the first sidewall 15 can be designed equal to the distance from the first light source 212 or the second light source 213 to the first sidewall 15 of the casing 10, so that, the space between the second side surface 211b and the first sidewall 15 can be used efficiently. The second heat sink 43 is attached to the third light source 214 for dissipating heat generated therefrom. In the present embodiment, the size of the second heat sink 43 together with the exhaust fan 44 is not bigger than the size of the air outlet 132.

The heat dissipating module 40 further includes a heat pipe 45 thermally connected the first heat sink 42 and the second heat sink 43. So that, the first heat sink 42 and the second heat sink 43 will have substantially same temperatures.

Referring to FIG. 4, the air flowing direction of the projector 100 is shown. The air coming into the casing 10 from the second air inlet 141 can dissipating a portion of heat generated from the PCB 30. A portion of the air coming into the casing 10 from the first air inlet 151 will first pass across the heat sink 32 mounted on the PCB 30 and then be blown towards the first heat sink 42, the other portion of the air coming into the casing 10 from the first air inlet 151 will be directly blown towards the first heat sink 42. A portion of the air outlet 132 spatially corresponding to the second heat sink 43 is used as an air inlet, through which the air coming into the casing 10 will pass then flow to the second heat sink 43, and then be evacuated from the casing 10 by the exhaust fan 44.

Figure 5:
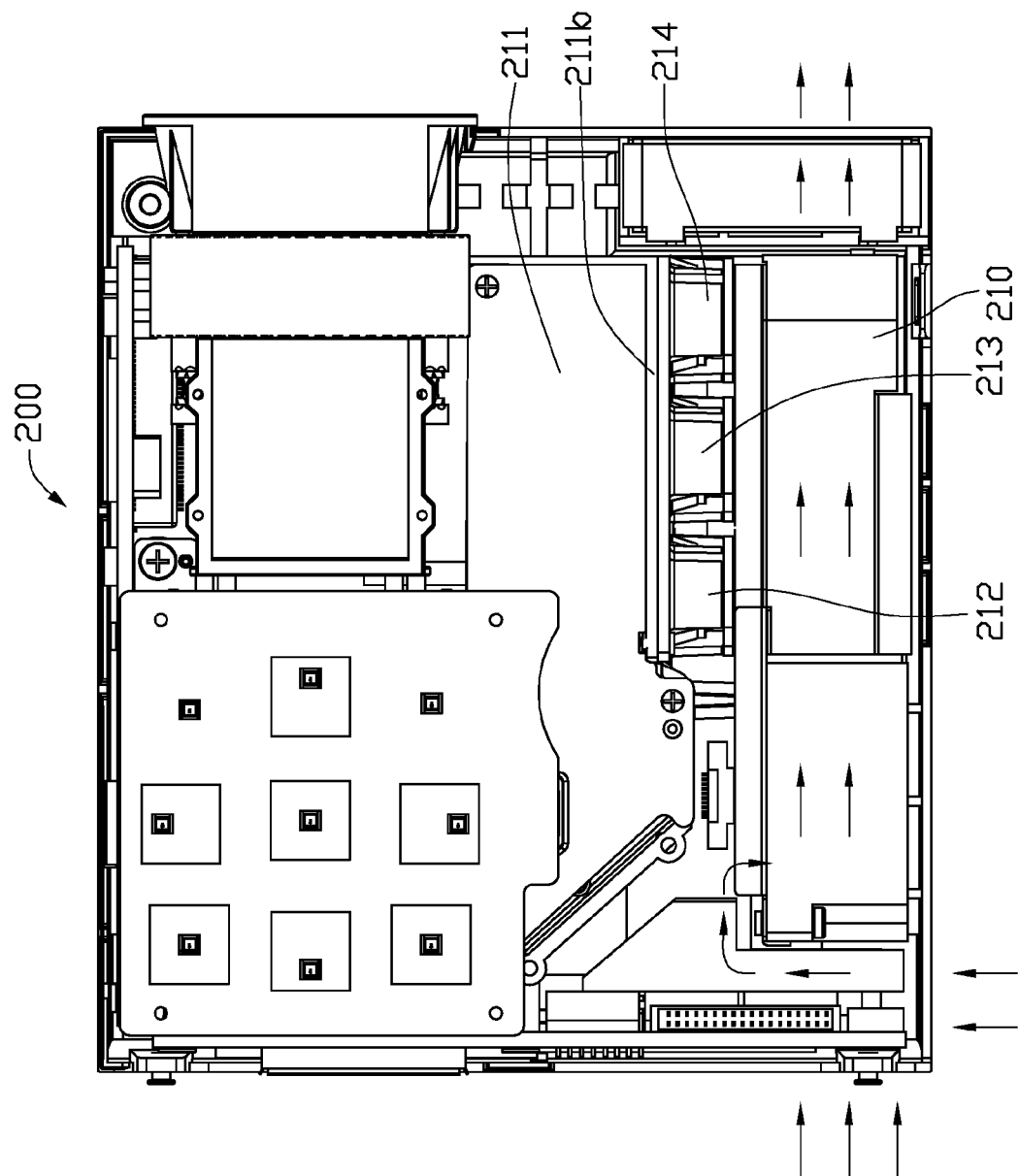
FIG. 5 is a top plan view of a projector according to a second exemplary embodiment without a top wall thereof.

Referring to FIG. 5, a projector 200 according to a second exemplary embodiment is shown. The projector 200 is similar to the projector 100 of the first exemplary embodiment. The difference between the projector 200 and the projector 100 is that, in the projector 200, the first light source 212, the second light source 213, the third light source 214 are all installed on the second side surface 211b of the housing 211, and attached to a heat sink 210, the first heat sink 42 and the second heat sink 43 are omitted.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A projector comprising:
    a casing comprising a first sidewall, a front wall, a second sidewall, and a rear wall connected in sequence, the front wall defining a hole adjacent to the second sidewall and an air outlet adjacent to the first sidewall, at least one air inlet being defined on the first sidewall or the rear wall;
    an optical engine received in the casing and configured for projecting an image, the optical engine comprising a lens module substantially aligned with the hole defined by the front wall, a digital micromirror device (DMD), and an illuminator module arranged at a side of the lens module away from the second sidewall, the illuminator module comprising a housing having a side surface adjacent to the first sidewall with respect to the lens module and at least one light source installed on the side surface; and
    a heat dissipating module received in the casing and comprising a first heat sink attached to the at least one light source installed on the side surface, a blower for blowing air towards the first heat sink from one of the at least one air inlet, and an exhaust fan for pulling the air passed across the first heat sink out of the casing from the air outlet.

2. The projector as claimed in claim 1, wherein the first sidewall defines a first air inlet adjacent to the rear wall.

3. The projector as claimed in claim 1, wherein the projector further comprises a PCB configured for controlling the optical engine, the PCB is arranged substantially parallel to the rear wall and adjacent to rear wall, the rear wall defines a second air inlet spatially corresponding to the PCB.

4. The projector as claimed in claim 3, wherein the casing comprises a bottom wall, the PCB is attached to a metal board which is secured on the bottom wall.

5. The projector as claimed in claim 1, wherein the DMD is attached to a heat conductive plate thermally connected to the casing.

6. The projector as claimed in claim 5, wherein the heat conductive plate is thermally connected to a heat diffusing plate secured on the casing and thermally connected to the casing.

7. The projector as claimed in claim 6, wherein a thermal interface material is disposed between the heat conductive plate and the heat diffusing plate.

8. The projector as claimed in claim 1, wherein the at least one light source of the illuminator module comprises three light sources, the housing further comprises an end surface substantially parallel to the front wall, two of the three light sources are installed on the side surface of the housing away from the lens module and attached to the first heat sink, and the other one of the three light sources is installed on the end surface and attached to a second heat sink.

9. The projector as claimed in claim 8, wherein the heat dissipating module further comprising a heat pipe thermally connected the first heat sink and the second heat sink.

10. The projector as claimed in claim 1, wherein the at least one light source of the illuminator module comprising three light sources, all of the three light sources are installed on the side surface of the housing away from the lens module and attached to the first heat sink.

11. The projector as claimed in claim 1, wherein the first heat sink comprises a number of fins substantially parallel to the direction of the flowing direction of the air blown by the blower.

12. The projector as claimed in claim 11, wherein the distance from the at least one light source to the first sidewall is equal to the height of the first heat sink along a direction perpendicular to the first sidewall.

13. A projector comprising:
    a casing comprising a first sidewall, a front wall, a second sidewall, and a rear wall connected in sequence, the front wall defining a hole and an air outlet, at least one air inlet being defined on the first sidewall or the rear wall;
    an optical engine received in the casing and configured for projecting an image onto a screen via the hole defined on the front wall, the optical engine comprising a lens module, and an illuminator module being substantially parallel to the lens module, the illuminator module comprising a housing having a side surface adjacent to the first sidewall with respect to the lens module and at least one light source installed on the side surface; and
    a heat dissipating module received in the casing and comprising a first heat sink attached to the at least one light source, a blower for blowing air towards the first heat sink from the at least one air inlet, and an exhaust fan for pulling the air passed across the first heat sink out of the casing from the air outlet.

14. The projector as claimed in claim 13, wherein the first sidewall defines a first air inlet adjacent to the rear wall.

15. The projector as claimed in claim 13, wherein the projector comprises a PCB for controlling the projection of the optical engine, the PCB is arranged substantially parallel to the rear wall and adjacent to rear wall, the rear wall defines a second air inlet spatially corresponding to the PCB.

16. The projector as claimed in claim 13, wherein the at least one light source of the illuminator module comprises three light sources, the housing further comprises an end surface substantially parallel to the front wall, two of the three light sources are installed on the side surface of the housing away from the lens module and attached to the first heat sink, and the other one of the three light sources is installed on the end surface and attached to a second heat sink.

17. The projector as claimed in claim 16, wherein the heat dissipating module further comprises a heat pipe thermally connected the first heat sink and the second heat sink.

18. The projector as claimed in claim 13, wherein the at least one light source of the illuminator module comprises three light sources, all of the three light sources are installed on the side surface of the housing away from the lens module and attached to the first heat sink.

19. The projector as claimed in claim 13, wherein the first heat sink comprises a number of fins substantially parallel to the direction of the flowing direction of the air blown by the blower.

20. The projector as claimed in claim 19, wherein the distance from the at least one light source to the first sidewall is equal to the height of the first heat sink along a direction perpendicular to the first sidewall.

* * * * *